United States Patent [19]
Emura et al.

[11] Patent Number: 5,650,879
[45] Date of Patent: Jul. 22, 1997

[54] LENS APPARATUS

[75] Inventors: Tetsuji Emura; Hiroshi Miyamae, both of Hachioji, Japan

[73] Assignee: Konica Corporation, Tokyo, Japan

[21] Appl. No.: 601,943

[22] Filed: Feb. 15, 1996

[30] Foreign Application Priority Data

Feb. 28, 1995 [JP] Japan .................................. 7-040054

[51] Int. Cl.$^6$ .................................................. G02B 7/02
[52] U.S. Cl. ............................................. 359/820; 359/819
[58] Field of Search ........................................ 359/819, 820

[56] References Cited

U.S. PATENT DOCUMENTS 3,784,287  1/1974  Grey ........................................ 359/819
4,886,342  12/1989 Kudo et al. ............................. 359/819

FOREIGN PATENT DOCUMENTS 0680532  2/1964  Canada ................................... 359/820
1017775  1/1966  United Kingdom ................... 359/820

*Primary Examiner*—Loha Ben
*Attorney, Agent, or Firm*—Frishauf, Holtz, Goodman, Langer & Chick, P.C.

[57] ABSTRACT

A lens apparatus in which plural lenses, each having a different expansion coefficient to others, are adhered to each other at their lens surfaces and some of the plural lenses, which has a smaller expansion coefficient than other lenses and the number of which is fewer than the total number of the plural lenses, are coupled with a lens barrel so that all of the plural lenses are supported by the lens barrel.

3 Claims, 4 Drawing Sheets

LENS APPARATUS

BACKGROUND OF THE INVENTION

This invention is related to a lens apparatus. More specifically, it is related to a lens apparatus which improves a lens supporting condition of photographing cameras, video cameras, and the like.

A conventional lens unit and its lens barrel are shown in FIG. 4 as an example of conventional lens systems.

In FIG. 4, 11 is a lens barrel, the material of which is a policarbonate resin being filled with glass fibers for strengthening the material (hereinafter this material is referred as GFPC: glass filled policarbonate). 1 is a glass lens. 2 is a plastic lens, the material of which is a policarbonate resin (hereinafter this material is referred as PC: policabonate). 3 is a plastic lens, the material of which is an acrylic resin (hereinafter this material is referred as PMMA: polymethyl metacrylate).

The three of lenses 1, 2 and 3 are respectively coupled with the lens barrel 11 as shown in the figure. The lenses are supported by a lens supporter, which is not shown in the figure, so that the lenses are prevented from being displaced from the right side of the barrel and the three of the lenses are constantly urged to the optical axis direction by a force of a suitable strength in a direction to the left side.

As the size of an apparatus, such as a camera, reduces recently, the influence on the focal plane of a lens system (so called "error sensitivity"), caused by discrepancies of the axes of the lenses from the optical axis of the lens system, becomes great. In the present example of a lens system, if one of the lenses has a discrepancy of 5 μm from the optical axis by shifting, an image deterioration caused by the discrepancy from the optical axis makes the normal function of the lens system impossible. Therefore, the difference between the outer diameter of a lens and the inner diameter of the lens barrel (hereinafter it is referred as "a clearance") always needs to be within the range of 0 μm–10 μm.

However, each lens of a lens system creates a different dimensional change according to a respective characteristic of the material when the lens system is placed in the condition of high temperature and humidity. For example, when a lens of the present example, having an outer diameter of about 10 mm, is moved from the condition of normal temperature and humidity to the condition of 60° C. in temperature and 90% in humidity, the change of the inner diameter of the lens barrel 11, which is made of a GFPC, is an increase between 0 μm and 2 μm because of the effects of glass fibers. In the same condition, the changes of the outer diameters of the glass lens 1 and the plastic lens 2, both being made of a PC, and of the plastic lens 3, being made of a PMMA, are respectively almost nothing, an increase of 5 μm, and an increase of 26 μm.

Therefore, if the clearances between the respective lenses and the lens barrel under the normal temperature are set to 8 μm, the clearances for the glass lens 1 and the plastic lens 2, being made of a PC, respectively become between 8 μm and 10 m and between 3 μm and 5 μm in the above condition; however, the clearance for the plastic lens 3, being made of a PMMA, becomes between −16 μm and −18 μm in which the outer diameter of the lens exceeds the inner diameter of the barrel and the lens is tightly caulked by the barrel.

A plastic lens is easily distorted by an external force; therefore when it is in above condition, the plastic lens 3 comes into the circumstance that a pressure is applied from its circumference, the curved surfaces of the lens are seriously distorted, and an image through the lens is deteriorated. However, if the clearance of 18 μm is set in a normal temperature, the optical axis of the lens can unpreferably be displaced. Further, additives such as glass fibers, which can avoid the influences of temperature, humidity and an external force, can not be mixed in a plastic in use with an optical system. Therefore, when plural lenses, which are made of different materials, are configured in one lens barrel, there are the serious problems explained above.

SUMMARY OF THE INVENTION

The present invention is to solve the above-explained problems. In other words, the objective of the present invention is to provide the lens apparatus in which a problem of an image deterioration caused by a displacement of optical axes, when plural lenses made of different materials are configured in one lens barrel, and a problem of an image deterioration caused by a distortion of lens surfaces, when a lens is caulked by a barrel because of changes of temperature and humidity, do not occur.

The above objective is achieved by the lens apparatus which is characterized in that plural lenses, each having a different expansion coefficient to others, are adhered to each other at their lens facing surfaces and a lens of the plural lenses, having the smallest expansion coefficient, is coupled with a lens barrel so that the plural lenses are supported by the lens barrel.

DETAILED DESCRIPTION OF THE INVENTION

The examples of the present invention will be explained with the attached FIGS. 1 through 3.

Figure 1:
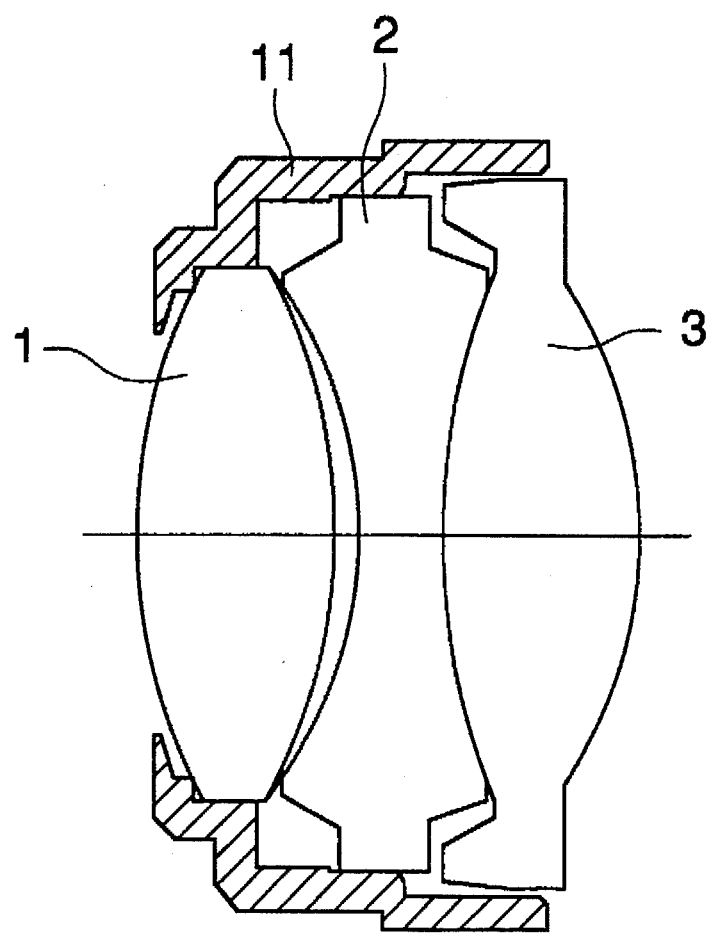
FIG. 1 shows a sectional view of an example of the lens apparatus according to the present invention.
Figure 4:
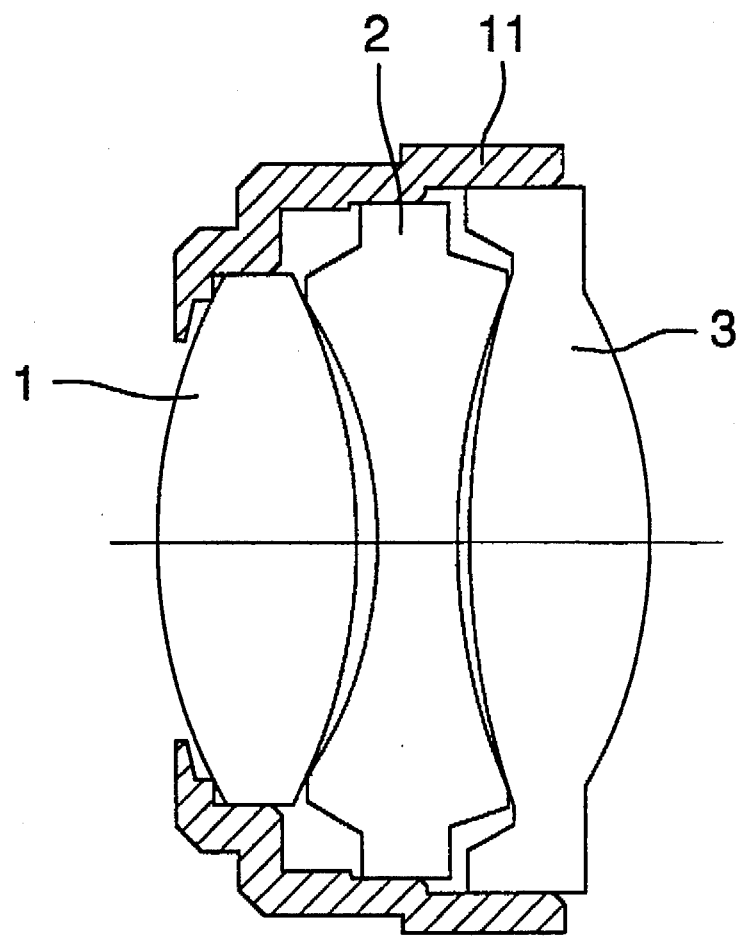
FIG. 4 shows a sectional view of a conventional lens apparatus.

FIG. 1 shows an example of the lens apparatus according to the present invention. 11 is a lens barrel which is made of a GFPC. It is exactly the same as in the conventional example shown in FIG. 4 that 1 is a glass lens, 2 is a plastic lens the material of which is a PC, and 3 is a plastic lens the material of which is a PMMA. The lenses to be coupled with the lens barrel 11 are only the glass lens 1, which has an expansion coefficient of almost nothing, and the plastic lens 2 of a PC which has a small expansion coefficient. The outer diameter of the plastic lens 3 of PMMA, having a large expansion coefficient, and the inner diameter of the lens barrel 11 are set so as to create a relatively large clearance between the two so that the plastic lens 3 is not coupled with the lens barrel 11.

As shown in FIG. 1, the curved surface, shown as the right side surface in the figure, of the plastic lens 2 is adhered to the curved surface, shown as the left side surface in the figure, of the plastic lens 3. The lenses are supported by a lens supporter, which is not shown is the figure, so that the lenses are prevented from being displaced from the right side of the barrel and the three of the lenses are constantly urged to the optical axis direction by a force of a suitable strength in a direction to the left side. This configuration is possible because the right side curved surface of the plastic lens 2 and the left side curved surface of the plastic lens 3 have almost the same radiuses of curvature; however, the problem of dimensional changes caused by the circumstance changes in the conventional example can be solved accordingly.

Therefore, regarding the glass lens 1 and the plastic lens 2, the clearances between the lenses and the lens barrel 11 never exceed 10µm even under the condition of high temperature and humidity when the clearances are set to 8 µm in the normal temperature as it is explained for the conventional example. Also, regarding the plastic lens 3, which expands greater than the glass lens 1 and the plastic lens 2, the clearance to the lens barrel 11 is set widely in the present invention; therefore, the plastic lens 3 can never be caulked by the barrel 11 while the conventional example causes caulking.

Further, because of the difference of expansion coefficients of the plastic lenses 2 and 3, a shear force is applied to the adhered surfaces of the plastic lenses 2 and 3. However, the shear force can be absorbed by the adhesive layer without being applied to the curved surfaces of the lenses when a suitable adhesive having a preferable elasticity is selected.

Therefore, the primary method of the present invention is that plural lenses, having greatly different expansion coefficients, are adhered to each other and a lens of the plural lenses, having a small expansion coefficient, is coupled with a lens barrel. For the present example, the combination of the adhesion of the lenses is of the plastic lens 2 of a PC and the plastic lens 3. This method is applicable to the combination of a glass lens and a plastic lens in the same manner that the glass lens, having a smaller expansion coefficient than that of the plastic lens, is coupled with the lens barrel. Further, the method is applicable not only to the combination of two lenses but also to that of three lenses in exactly the same manner.

Figure 2:
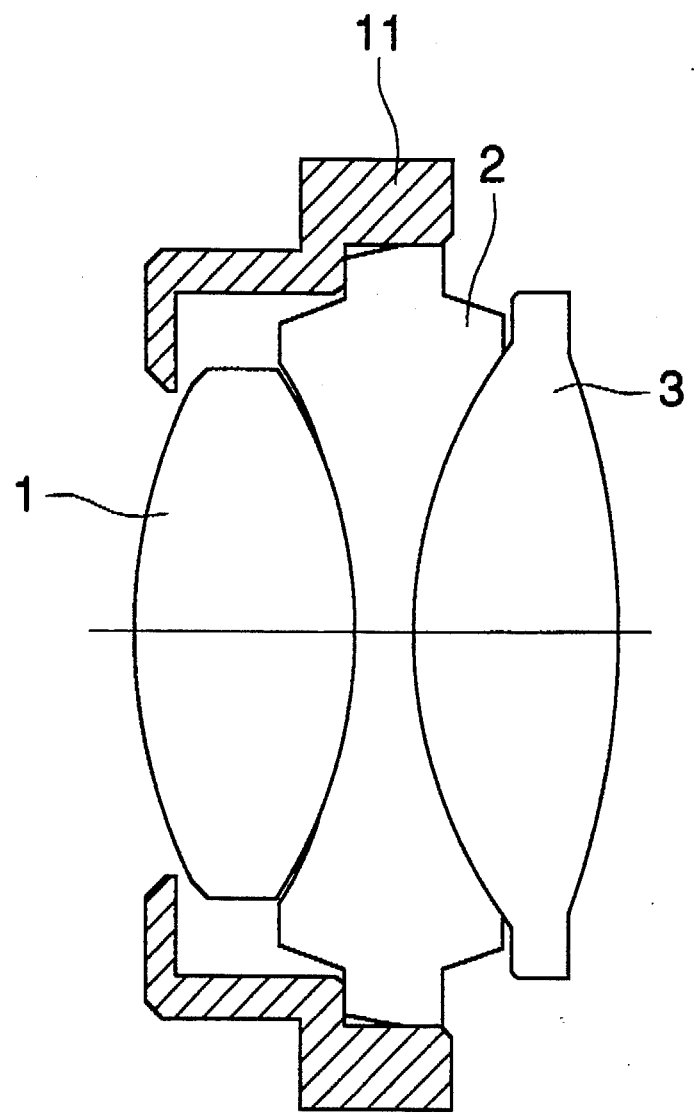
FIG. 2 shows a sectional view of an example of the lens apparatus according to the present invention in which three lenses are adhered to each other.

The example that three lenses are adhered is shown in FIG. 2. In the figure, 11 is a lens barrel of a GFPC, 1 is a glass lens, 2 is a plastic lens of a PC, and 3 is a plastic lens of a PMMA. Only the plastic lens 2 of a PC, which has a small expansion coefficient, is coupled with the lens barrel 11 in the present example, and this configuration results in the same effectiveness of the prior example. If the diameter of the glass lens 1 is modified so that only the glass lens 1, having the smallest expansion coefficient among the adhered three lenses, is coupled with the lens barrel 11, the configuration also results in the same effectiveness of the prior example.

Further, The lenses are supported by a lens supporter, which is not shown in the figure, so that the lenses are prevented from being displaced from the right side of the barrel by a force of a suitable strength in a direction to the left side. In this case, the lens supporter naturally only supports the lens which is coupled with the lens barrel 11. The lens surface to be adhered can be not only a spherical surface but also an aspherical surface or a flat surface.

Figure 3:
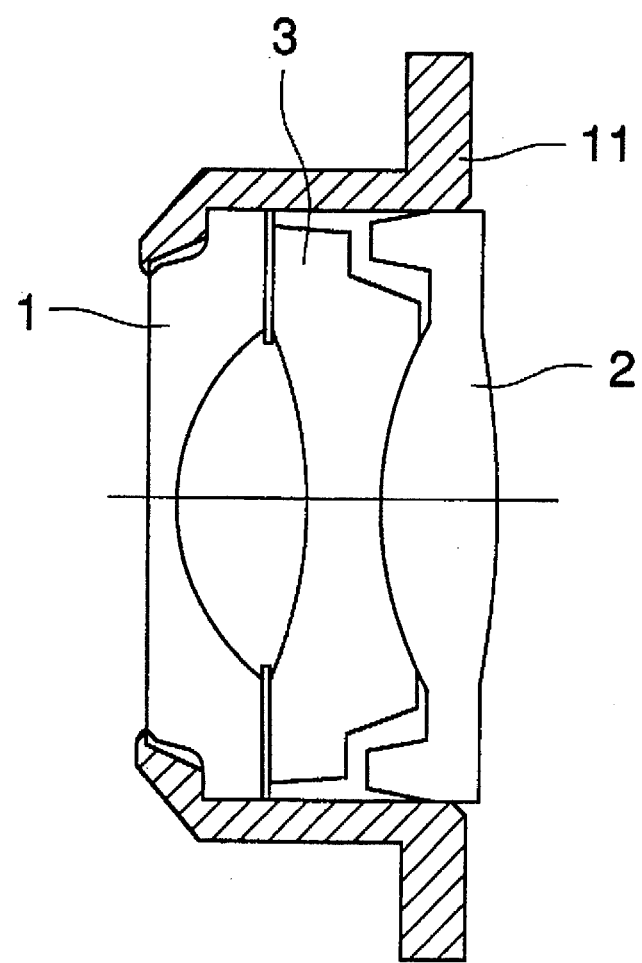
FIG. 3 shows a sectional view of another example of the lens apparatus according to the present invention.

Next, another example is shown in FIG. 3. In the figure, 11 is a lens barrel of a GFPC, 1 is a glass lens, 3 is a plastic lens of a PMMA, and 2 is a plastic lens of a PC. The lenses are supported by a lens supporter, which is not shown is the figure, so that the lenses are prevented from being displaced from the right side of the barrel and the three of the lenses are constantly urged to the optical axis direction by a force of a suitable strength in a direction to the left side. In the present example, the plastic lenses 2 and 3 are adhered to each other, and the one which is coupled with the lens barrel is the plastic lens 2 which has a smaller expansion coefficient. Although the order of the plastic lenses 2 and 3 for being inserted in the lens barrel 1 is opposite to that in the example of FIG. 1, the effectiveness of the present example is the same as that of the example in FIG. 1.

According to the present invention, the lens apparatus, in which a problem of an image deterioration caused by a displacement of optical axes when plural lenses made of different materials are configured in one lens barrel and a problem of an image deterioration caused by a distortion of lens surfaces when a lens is caulked by a barrel because of changes of temperature and humidity do not occur, is provided.

What is claimed is:

1. A lens apparatus, comprising:

A plurality of lenses, each having a different expansion coefficient to other ones of said plurality of lenses, wherein at least two of said plurality of lenses are adhered to each other at their lens facing surfaces;
a lens barrel for being coupled with at least one of said plurality of lenses; and said lens barrel for supporting said plurality of lenses;
wherein a number of said at least one of said plurality of lenses, being coupled with said lens barrel, is fewer than a total number of said plurality of lenses, and said at least one of said plurality of lenses, being coupled with said lens barrel, has a smaller expansion coefficient than an expansion coefficient of other ones of said plurality of lenses, not being coupled with said lens barrel.

2. The lens apparatus of claim 1, wherein said lens surfaces, at which said at least two of said plurality of lenses are adhered, include at least one of a spherical surface and an aspherical surface.

3. The lens apparatus of claim 1, wherein said at least one of said plurality of lenses, being coupled with said lens barrel, includes a lens having the smallest expansion coefficient among said plurality of lenses.

* * * * *